May 15, 1951      D. C. VIERIU      2,552,877
FISH STRINGER
Filed March 31, 1950
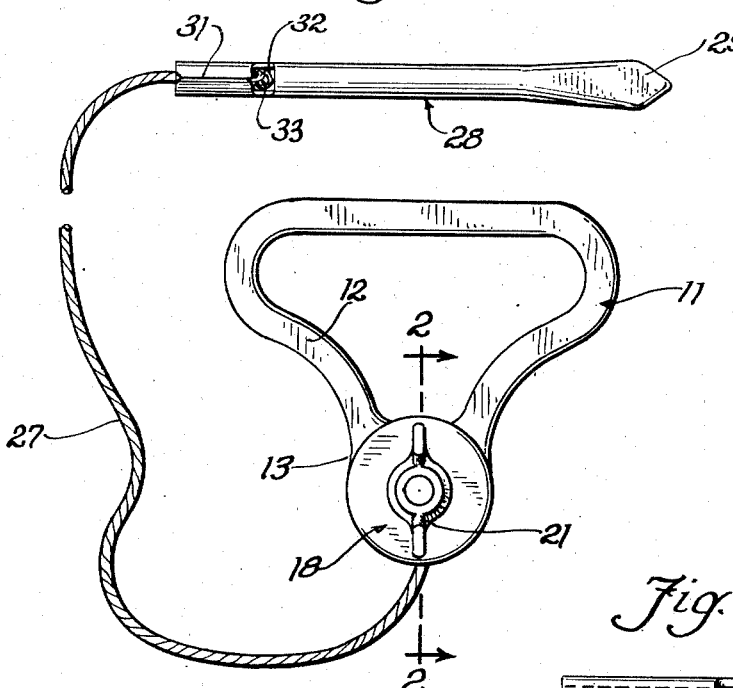
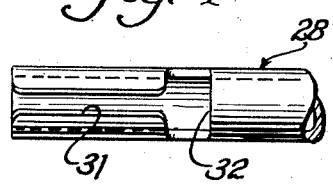
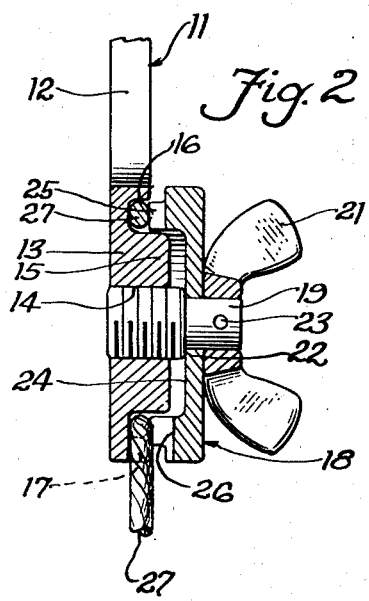
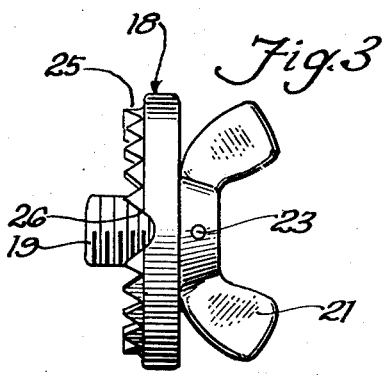
INVENTOR.
Daniel C. Vieriu
BY
Sheridan, Davis & Cargill
Attys Patented May 15, 1951

2,552,877

UNITED STATES PATENT OFFICE 2,552,877

FISH STRINGER

Daniel C. Vieriu, Chicago, Ill.

Application March 31, 1950, Serial No. 153,126

4 Claims. (Cl. 224—7)

This invention relates generally to fish stringers, and more particularly to such a device having outstanding utility characteristics with relation to temporary retention or stringing of fish that have been caught, carrying or transporting the same thereon, and ease of removing the fish therefrom.

A principal object of the invention is the provision of a fish stringer upon which fish may be strung in the usual manner and from which they may be removed without appreciable effort and without requiring the withdrawal of the fish therefrom in the reverse order and direction from those in which they were strung initially.

Another object is to provide a fish stringer comprising an impaling guide or bodkin, a cord, and a stop or handle member readily removably secured to the cord, whereby detachment of the stop or handle member from the cord will permit removal of the fish from the stringer merely by pulling on the original entry end of the cord.

A further object of the invention is the provision of such a stop or handle member for a fish stringer having a handle or bail-shaped portion, an annular cord-receiving groove, and clamping means readily attachable thereto and detachable therefrom to secure one end portion of the cord in the groove.

Another object is to so arrange such cord-receiving groove and clamping means that two separate portions of the cord may readily be engaged thereby, if desired, to enable use of the stop or handle member as the only means necessary to employ with the cord to carry one or a plurality of fish.

A further object is to provide a bodkin member or impaling guide in the form of a tube having one end open and T-slotted longitudinally for a short distance from such end to receive a knotted end of the cord and be secured thereto by squeezing together of the side portions defining the longitudinal part of the T-slot.

Numerous other objects and advantages of the invention will be apparent as it is better understood from the following description, which, when taken in connection with the accompanying drawings, discloses a preferred embodiment thereof.

In the drawings:

Figure 1 is a front elevational view of a fish stringer embodying the features of the invention;

Fig. 2 is an enlarged vertical section taken substantially on line 2—2 of Fig. 1 through the cord-clamping portion of the stop or handle member;

Fig. 3 is a bottom plan view of the clamping member removed from the handle member; and Fig. 4 is an enlarged detail elevation of the cord-engaging end of the impaling guide or bodkin member, showing the same prior to attachment of the cord thereto.

Referring more particularly to the drawings, reference numeral 11 indicates in general the stop or handle member of the instant fish stringer which comprises a bail-shaped handle portion 12 formed integrally with a circular base portion 13 (Fig. 2) having a threaded bore 14 extending therethrough. The forward side of this base portion 13 extends beyond the forward surface of the handle portion 12 to form a raised, circular hub portion 15 concentric with the threaded bore 14. Surrounding this central hub 15 is an annular groove 16 formed in the forward surface of the base portion 13 of a depth approximately one-half of the thickness of the handle portion 12 and having its inner circular wall formed as an extension of the peripheral surface of the hub portion 15. At its lower end, the base portion 13 is provided with a clearance notch 17 (shown in broken lines in Fig. 2) of substantially the same width as the annular groove 16 and communicating therewith.

Clamping means in the form of a member indicated generally by reference numeral 18, a shouldered bolt 19 and a wing nut 21, are removably attachable to the circular base portion 13. The bolt 19 is threadedly dimensioned at its rear end for engagement in the tapped bore 14, as seen in Fig. 2, and is reduced in diameter at its forward end to provide a shoulder 22 for engagement by the clamping member 18. The forward reduced end of the bolt 19 passes through a suitable central aperture in the clamping member 18, and the wing nut 21 is secured to the forward end of the bolt, as by means of a pin 23, so that the clamping member 18 is rotatably mounted upon the bolt 19.

The rear face of the clamping member 18 is counter-bored to provide a circular recess 24 slightly greater in diameter than the circular hub portion 15 of the handle member 11 (Fig. 2). Suitable cord-clamping elements are provided on the rear surface of the member 18 in the form of a serrated, annular rib 25 concentrically disposed relative to the counter-bored recess 24. The width of this serrated rib 25 is slightly less than that of the groove 16, and the depth of teeth formed thereby is slightly less than the front-to-rear depth of the annular groove 16. The outer diameter of the clamping member 18 is substantially the same as that of the circular base portion 13 of the handle member 11 so that, when assembled, the device presents the clean design appearance best illustrated in Fig. 1. The clamping member 18, as shown in Fig. 3, is provided with a clearance notch 26 in its rear surface extending downwardly through the serrated rib 25 for cooperation with the notch 17 in the handle member 11 in a manner to be described in detail hereinafter.

In addition to the handle member 11 and clamping member 18 above described, the instant fish stringer comprises a cord 27 and an impaling guide or bodkin member 28 (Fig. 1). One end of the cord 27 is adapted to be secured to the handle member 11 by placing the same in the annular groove 16 and securing it therein by screw-threadedly mounting the clamping member 18 on the handle member and tightening the wing nut 21 sufficiently to firmly engage the teeth formed by the serrated rib 25 with this end portion of the cord disposed in the groove 16. The notches 17 and 26 provide exit clearance for the cord 27 from the groove 16, as best seen in Fig. 2. The handle member 11, comprising the handle portion 12 and the attachable clamping members 18, 19 and 21, preferably are constructed as die-cast and screw-machined metal parts and plated or otherwise treated to be resistant to moisture, but these members may be made from a suitable plastic material, if desired.

The impaling guide or bodkin member 28 preferably comprises a hollow copper tube pinched together or flattened and finished at one end at 29, as illustrated in Fig. 1. The other end of this tube is open and has one wall thereof T-slotted, as shown in Fig. 4, by means of a transverse slot 31 and a longitudinal slot 32 of somewhat narrower width and extending between this end of the tube and the slot 31. Attachment of one end of the cord 27 to the member 28 is thereby facilitated, since it is necessary only to tie a suitable knot 33 (Fig. 1) at the end of the cord, slide the end portion of the cord through the longitudinal slot 32 into the tube, forcing the knot through the transverse slot 31, and squeeze the end walls of the tube together, i. e., the flap portions of the tube defined by the T-slot 31, 32, to the position shown in Fig. 1. A portion of the knot 33 will thus be held against withdrawal from the tube by engagement with the shoulders formed by the side wall of the transverse slot 31 intersected by the longitudinal slot 32.

It will be understood that the instant fish stringer readily adapts itself for use with a cord 27 of any desired length and any suitable physical characteristics. With the bodkin member 28 and the handle member 11 secured to the opposite ends of the cord 27 as illustrated in Fig. 1, the stringer may be employed in the usual manner for retaining fish that have been caught. The bodkin member 28 is shaped as previously described to facilitate passage of its entry end through the gills and throat of a fish. This entry end portion of the cord 27 then may be secured in any suitable manner to permit the fish strung on the stringer to hang in the water, the handle member 11 forming a suitable stop to prevent the fish sliding off of the other end of the cord. In the event the fish so strung are of such size as to present the possibility of the handle member 11 being forced through their gills, or if for any other desired reason, the bodkin member 28 may be passed through the bail portion 12 of the handle member 11, after stringing of the fish, and either tied thereto or suitably secured to any desired supporting member.

For purposes of readily transporting or carrying one or a plurality of fish strung on the instant stringer, the bodkin member 28 may be disposed relative to the handle member 11 somewhat in the position illustrated in Fig. 1 and grasped together therewith, the fingers of one hand passing through the bail portion 12 and the bodkin member 28 being held against the handle member in the palm of the hand. Or, if desired, the clamping member 18 may be loosened by retrograde rotation of the wing nut 21, and a portion of the cord 27 adjacent the bodkin member 28 passed around the raised hub portion 15 and through the clearance notches 17, 26, and the wing nut re-tightened to clamp both end portions of the cord to the handle member. The relative dimensioning of these several parts, best illustrated in Fig. 2, permits such simultaneous clamping of separate portions of the cord 27.

When it is desired to remove any fish from the instant stringer, it is necessary only to detach that end of the cord 27 clamped to the handle member 11 by loosening the wing nut 21 and clamping member 18, and exert a pulling force upon the cord from its entry end. In other words, it is an extremely simple matter to remove the fish from this stringer, and such removal does not require any appreciable effort or withdrawal of the fish therefrom in the reverse order and direction from those in which they were strung initially. It is necessary only to detach the handle member 11 from the cord and pull the cord, from its other end, from the fish.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A fish stringer, comprising an impaling guide, a cord attached at one end to the trailing end of said guide, and carrying and stop means removably attachable to the other end of said cord, comprising a handle member having means for receiving said cord, and a clamping member removably mounted on said handle member for securing said cord thereto, said cord-receiving means on said handle member comprising an annular groove, and said clamping member including a serrated annular rib clampingly engageable with that portion of the cord disposed in said groove.

2. A fish stringer according to claim 1, wherein said handle member is provided with a tapped aperture centrally disposed relative to said annular groove, and said clamping member includes a bolt rotatably mounted thereon for screw-threaded engagement with said aperture.

3. A fish stringer according to claim 2, wherein said handle member and said clamping member are provided with companion clearance notches radially disposed relative to said annular groove and serrated rib and communicating with the former and extending through the latter, respectively, to provide an entry passage to said groove for said cord.

4. In a device of the class described, a handle member removably attachable to selected portions of a cord, comprising a main body portion having a tapped bore and an annular groove in one side surface thereof concentrically disposed relative to said bore to receive said selected portions of the cord, a bolt adapted to be screwed manually into said bore, and a clamping member rotatably mounted on said bolt and having means for engaging those portions of the cord disposed in said groove, upon tightening of said bolt, to clamp the same against the bottom of said groove.

DANIEL C. VIERIU.

REFERENCES CITED

The following references are of record in the file of this patent:

UNITED STATES PATENTS

| Number | Name | Date |
|---|---|---|
| 927,840 | Dineen | July 13, 1909 |
| 1,176,177 | Sparks | Mar. 21, 1916 |
| 2,047,834 | Plasters | July 14, 1936 |
| 2,514,483 | Felton et al. | July 11, 1950 |
| 2,519,528 | Williamson | Aug. 22, 1950 |
| 2,539,496 | Towey | Jan. 30, 1951 |